United States Patent
Dinda et al.

(10) Patent No.: US 9,783,743 B2
(45) Date of Patent: Oct. 10, 2017

(54) PROCESS AND COMPOSITION OF CATALYST/ADDITIVE FOR REDUCING FUEL GAS YIELD IN FLUID CATALYTIC CRACKING (FCC) PROCESS

(71) Applicant: RELIANCE INDUSTRIES LIMITED, Mumbai, Maharashtra (IN)

(72) Inventors: Srikanta Dinda, West Bengal (IN); Praveen Kumar Chinthala, Andhra Pradesh (IN); Amit Gohel, Gurajat (IN); Ashwani Yadav, Haryana (IN); Sukumar Mandal, Haryana (IN); Gopal Ravichandran, Tamil Nadu (IN); Asit Kumar Das, Gujarat (IN)

(73) Assignee: Reliance Industries Limited, Mumbai, Maharashtra (IN)

( * ) Notice: Subject to any disclaimer, the term of this patent is extended or adjusted under 35 U.S.C. 154(b) by 708 days.

(21) Appl. No.: 14/148,107

(22) Filed: Jan. 6, 2014

(65) Prior Publication Data

US 2014/0116923 A1    May 1, 2014

Related U.S. Application Data

(63) Continuation of application No. PCT/IN2011/000678, filed on Sep. 29, 2011.

(30) Foreign Application Priority Data

Jul. 6, 2011 (IN) .......................... 1955/MUM/2011

(51) Int. Cl.
| | |
|---|---|
| *C10G 11/05* | (2006.01) |
| *C10G 11/18* | (2006.01) |
| *B01J 29/80* | (2006.01) |
| *B01J 29/40* | (2006.01) |
| *B01J 29/08* | (2006.01) |
| *B01J 29/70* | (2006.01) |
| *B01J 35/02* | (2006.01) |
| *B01J 35/10* | (2006.01) |
| *B01J 37/00* | (2006.01) |

(52) U.S. Cl.
CPC ............... *C10G 11/05* (2013.01); *B01J 29/80* (2013.01); *C10G 11/18* (2013.01); *B01J 29/088* (2013.01); *B01J 29/40* (2013.01); *B01J 29/7046* (2013.01); *B01J 29/7057* (2013.01); *B01J 35/023* (2013.01); *B01J 35/1019* (2013.01); *B01J 35/1038* (2013.01); *B01J 37/0045* (2013.01); *B01J 2229/183* (2013.01); *B01J 2229/186* (2013.01); *B01J 2229/36* (2013.01); *B01J 2229/42* (2013.01); *C10G 2400/02* (2013.01); *C10G 2400/20* (2013.01); *C10G 2400/26* (2013.01); *C10G 2400/28* (2013.01)

(58) Field of Classification Search
CPC . B01J 29/088; B01J 29/40; B01J 29/80; B01J 29/7046; B01J 29/7057; C10G 11/05; C10G 11/18; C10G 2400/02; C10G 2400/20; C10G 2400/26; C10G 2400/28

See application file for complete search history.

(56) References Cited

U.S. PATENT DOCUMENTS

| | | | |
|---|---|---|---|
| 4,451,355 A | 5/1984 | Mitchell et al. | |
| 5,260,240 A | 11/1993 | Guthrie et al. | |
| 6,103,949 A | 8/2000 | Demmel et al. | |
| 2008/0058197 A1* | 3/2008 | Liu .......................... | B01J 29/06 502/63 |

FOREIGN PATENT DOCUMENTS

| | | |
|---|---|---|
| CN | 1353165 A | 6/2002 |
| CN | 1727444 A | 2/2006 |
| CN | 1749362 A | 3/2006 |

OTHER PUBLICATIONS

International Search Report of PCT/IN2011/000678 dated Apr. 19, 2012, 3 pages.
Escobar et al., Effect of Iron and calcium over USY coke formation, Applied catalysis A: General, vol. 339, (2008) pp. 61-67.
Komatsu et al., Selective formation of alkenes through the cracking of n-heptene on Ca2-exchanged ferrierite, Applied catalysis A: General, vol. 214, (2001), pp. 103-109.
Letzsch et al., FCC catalysts sensitive to alkali contaminants, Oil & Gas journal, Nov. 29, 1982, pp. 59-68).

\* cited by examiner

*Primary Examiner* — Brian McCaig
(74) *Attorney, Agent, or Firm* — Collard & Roe, P.C.

(57) ABSTRACT

The present invention relates to a catalyst composition for Fluid Catalytic Cracking (FCC) which contains a combination of a FCC catalyst component and an additive component with certain physical properties attributed therein. The present invention is also directed to provide methods for the preparation of the catalyst composition for FCC. The admixture of the FCC catalyst component and additive component is used in cracking of hydrocarbon feedstock containing hydrocarbons of higher molecular weight and higher boiling point and/or olefin gasoline naphtha feedstock for producing lower yield of fuel gas without affecting the conversion and yield of general cracking products such as gasoline, propylene and $C_4$ olefins.

8 Claims, No Drawings

PROCESS AND COMPOSITION OF CATALYST/ADDITIVE FOR REDUCING FUEL GAS YIELD IN FLUID CATALYTIC CRACKING (FCC) PROCESS

CROSS REFERENCE TO RELATED APPLICATIONS

This is a Continuation application of PCT/IN2011/000678 filed on Sep. 29, 2011, which claims priority under 35 U.S.C. 119 of Indian Application No. 1955/MUM/2011 filed on Jul. 6, 2011, the disclosures of which are incorporated by reference. The international application under PCT article 21(2) was published in English.

FIELD OF THE INVENTION

The invention relates to a process for the preparation of a Fluid Catalytic Cracking (FCC) catalyst and an additive for cracking of high boiling point petroleum feedstock.

Definitions

As used in the present disclosure, the following words and phrases are generally intended to have the meaning as set forth below, except to the extent that the context in which they are used to indicate otherwise.

The expression "Higher boiling point petroleum feedstock" means the petroleum feedstock or fraction thereof having boiling point greater than 450° C. (Please refer Australian institute of petroleum representing Australia's oil industry)

BACKGROUND AND PRIOR ART DISCUSSION

FCC catalysts and additives have found their prolific use in petrochemical refining industries for improving the profitability of refiners. FCC catalysts are employed to crack low valuable petroleum crude oil comprising high boiling range, higher molecular weight hydrocarbon fractions to more valuable products such as LPG, gasoline and diesel. Since the introduction of zeolite based FCC catalysts in place of conventionally used acid-leached clays and artificial or natural silica-alumina catalysts, petroleum refining industries have observed a remarkable revolution in the designing and formulation of zeolite based FCC catalysts. Designing of the FCC catalysts based on different cracking process conditions and desired particular products have become the mainstay of the refineries.

Other than designing the FCC catalyst, use of different cracking catalyst-additives in combination with the FCC catalyst to obtain different products with varying properties and attributes has also been a point of great interest among research communities. For example, pentasil zeolite based additive is used for improving LPG and octane number of gasoline component. SOx additive is used for the reduction of sulfur emission, CO-Promoter additive is used for containment of CO emission while Bottom cracking additives are used for reducing bottoms.

In the case of LPG production, the use of cracking catalyst-additive plays an important role in boosting LPG production and/or to improve the octane number of gasoline, however, it also produces additional fuel gases, which may restrict the FCC operation due to reactor cyclone velocity limitation.

Further to this, the increased use of cheaper feedstocks i.e. heavy oil/resid/opportunity crudes also contributes towards production of more fuel gas.

This is because, in addition to the inferior cracking behavior of heavy feedstock, both metals and basic nitrogen compounds, which are known to poison FCC catalysts, are concentrated in the heavier end of gas oils, especially in the residuum. These poisons, present within large hydrocarbon molecules, deposit on the FCC catalyst, thereby deactivating the FCC catalyst and the additive. This results in production of more fuel gas and coke which ultimately lowers the overall conversion. The higher fuel gas yield often touches reactor cyclone velocity limits which results in lower severity operation of FCC unit, such as lower riser temperature. Similarly, higher coke yield leads to a higher regenerator temperature that lowers unit conversion.

Therefore, there is always felt a need to develop a FCC catalyst/additive system, which substantially lowers fuel gas production without affecting the general yield pattern of the cracking products thereby meeting the requirement of LPG, gasoline, diesel while lowering the undesirable bottom or clarified slurry oil (CSO).

U.S. Pat. No. 4,451,355 discloses a process for the conversion of hydrocarbon oil feed having a significant concentration of vanadium to light oil products in the presence of a cracking catalyst containing calcium compound such as calcium-titanium, calcium-zirconium, calcium-titanium-zirconium oxides and mixtures thereof. However, the scope of the process disclosed in U.S. Pat. No. 4,451,355 is limited to passivate the vanadium deposited on the catalyst during the catalytic cracking process and it is silent on the production of fuel gas.

U.S. Pat. No. 5,260,240 discloses a process for passivating the reactivity of nickel and vanadium in a cracking catalyst by adding a calcium-additive with the metal laden catalyst. The process employs an additive prepared from dolomite and sepiolite material for extracting vanadium and nickel from metal laden FCC catalyst in the presence of steam at high temperature. Calcium containing additive found to enhance the activity of cracking catalyst.

Escobar et al. (Applied catalysis A: General, vol. 339, (2008) 61-67) teaches the effect of calcium on coke formation over ultra stable Y zeolite catalyst in the absence and presence of nickel and vanadium metal. Different zeolite samples are prepared by impregnating nickel and vanadium on ultra stable Y zeolite, previously exchanged with calcium. The catalyst samples are used for cracking of n-hexane at 500° C. The study showed that catalyst containing Ca in combination with nickel and vanadium reduces coke formation and increases olefin to paraffin ratio.

Komatsu et al. (Applied catalysis A: General, vol. 214, (2001) 103-109) discloses the cracking of n-heptane on calcium exchanged ferrierite zeolite catalysts. $Ca^{2+}$ exchanged ferrierite catalyst gives higher alkenes selectivity due to less secondary hydride transfer reaction from hydrogen-deficient species. It is also disclosed that the coke formation is suppressed on account of the presence of $Ca^{2+}$ exchanged ferrierite.

Letzsch et al. (Oil & Gas journal, Nov. 29, 1982, 59-68) disclose the effect of alkali/alkaline metal contaminants like sodium, potassium, calcium and magnesium on FCC catalyst. The presence of sodium and potassium decreases the catalyst activity to a larger extent than calcium and magnesium for the cracking of cetane as model compound. The study however is silent on product selectivity with said modifications.

The present state of the art is silent on teaching the effect of calcium on product selectivity and its impact on fuel gas yield particularly in the absence of contaminant metals.

Therefore, the present invention is directed to the development of FCC catalyst component and additive component containing alkaline earth metals for cracking of a hydrocarbon feedstock, particularly in the absence of contaminant metals, for lowering the production of fuel gas without altering the cracking products yield.

Objects of the Present Invention

It is an object of the present invention to provide a catalyst composition for fluid catalytic cracking (FCC).

It is another object of the present invention is to provide a FCC catalyst composition for the cracking of a hydrocarbon feedstock which can improve the production of the cracking products.

It is a yet another object of the present invention to provide a FCC catalyst composition for the cracking of a hydrocarbon feedstock that reduces the production of a fuel gas without affecting the cracking product yield.

It is still another object of the present invention to provide a process for the preparation of a catalyst composition for FCC.

It is a further object of the present invention to provide a process cracking a hydrocarbon feedstock containing hydrocarbons of higher boiling point and higher molecular weight using a catalyst composition.

SUMMARY OF THE INVENTION

In accordance with the present invention, there is provided a process for cracking of higher boiling point petroleum feedstock in the presence of a catalyst composition to reduce dry gas production without affecting the yield of LPG, light olefins and gasoline products; said process comprising the steps of:
contacting said feedstock at a predetermined temperature with the catalyst composition in a fluidized bed; wherein the catalyst composition comprises:
  (a) a FCC catalyst component comprising:
    at least one zeolite in an amount ranging between 5 and 60 wt %;
    at least one clay in an amount ranging between 10 and 40 wt %;
    at least one binder in an amount ranging between 5 and 40 wt %;
    at least one alkaline earth metal in an amount ranging between 0.01 and 2.0 wt %; and
    at least one rare earth metal in an amount ranging between 0.01 and 2.0 wt %;
  and
  (b) an additive component comprising:
    at least one zeolite in an amount ranging between 5 and 60 wt %;
    at least one clay in an amount ranging between 10 and 40 wt %;
    at least one binder in an amount ranging between 5 and 40 wt %;
    at least one alkaline earth metal in an amount ranging between 0.01 and 2.0 wt %; and
    at least one phosphorous containing compound in an amount ranging between 4 and 16 wt %,
all proportion being with respect to the weight of the respective components.

Typically, the catalyst composition is adapted to reduce lower dry gas production in the range of 20 to 60% during the catalytic cracking process of said feedstock.

Typically, the alkaline earth metal is present in an amount in the range of 0.01 to 2.0 wt %; wherein the alkaline earth metal is at least one selected from the group consisting of calcium, magnesium and strontium; preferably calcium.

Typically, the rare earth metal is selected from the group consisting of lanthanum, cerium, neodymium, samarium, gadolinium, yttrium and combinations thereof.

Typically, the zeolite present in the FCC catalyst component is selected from the group consisting of REY, REUSY, USY, beta and combinations thereof.

Typically, the clay is at least one selected from the group consisting of Kaolin and halloysite Typically, the zeolite present in the additive component is a medium pore size zeolite selected from the group consisting of ZSM-5, ZSM-11, ZSM-23 zeolite and combinations thereof.

Typically, the binder in the FCC catalyst component comprises an acid treated alumina, colloidal silica and combinations thereof; wherein the alumina is selected from the group consisting of amorphous alumina gel, aluminum trihydride, psuedoboehmite alumina, gamma alumina and mixtures thereof.

Typically, the binder in the additive component comprises at least one ingredient selected from the group consisting of an acid treated alumina, and colloidal silica; wherein the alumina is selected from the group consisting of amorphous alumina gel, aluminum trihydride, psuedoboehmite alumina, gamma alumina and mixtures thereof.

Typically, the ratio of the FCC catalyst component and the additive component ranges between 1:1 and 10:1.

Typically, the phosphorous containing compound is at least one selected from the group consisting of phosphoric acid, mono ammonium dihydrogen phosphate and diaamonium hydrogen phosphate triammonium phosphate.

Typically, the amount of zeolite in the FCC catalyst component and/or additive component ranges between 30 and 60 wt %, whereas the amount of clay in FCC catalyst component and/or additive component ranges between 10 and 40 wt %.

In accordance with another aspect of the present invention there is provided a catalyst composition for Fluid Catalytic Cracking (FCC), said catalyst composition comprising:
  (c) a FCC catalyst component comprising
    at least one zeolite in an amount ranging between 5 and 60 wt %;
    at least one clay in an amount ranging between 10 and 40 wt %;
    at least one binder in an amount ranging between 5 and 40 wt %;
    at least one alkaline earth metal in an amount ranging between 0.01 and 2.0 wt %; and
    at least one rare earth metal in an amount ranging between 0.01 and 2.0 wt %;
  and
  (b) an additive component comprising:
    at least one zeolite in an amount ranging between 5 and 60 wt %;
    at least one clay in an amount ranging between 10 and 40 wt %;
    at least one binder in an amount ranging between 5 and 40 wt %;
    at least one alkaline earth metal in an amount ranging between 0.01 and 2.0 wt %; and at least one phosphorous containing compound in an amount ranging between 4 and 16 wt %, all proportion being with respect to the weight of respective components.

Typically, the alkaline earth metal is at least one selected from the group consisting of calcium, magnesium and strontium; preferably calcium.

Typically, the FCC catalyst component comprises a rare earth metal selected from the group consisting of lanthanum, cerium, neodymium, samarium, gadolinium, yttrium and combinations thereof.

Typically, the zeolite present in the FCC catalyst component is selected from the group consisting of REY, REUSY, USY, beta and combinations thereof.

Typically, the zeolite present in the additive component is a medium pore size zeolite selected from the group consisting of ZSM-5, ZSM-11, ZSM-23 zeolite and combinations thereof.

Typically, the clay is at least one selected from the group consisting of Kaolin and halloysite.

Typically, the binder in the FCC catalyst component comprises an acid treated alumina, colloidal silica and combinations thereof; wherein the alumina is selected from the group consisting of amorphous alumina gel, aluminum trihydride, psuedoboehmite alumina, gamma alumina and mixtures thereof.

Typically, the binder in the additive component comprises at least one ingredient selected from the group consisting of clay, phosphorus treated clay, an acid treated alumina, and colloidal silica; wherein the alumina is selected from the group consisting of amorphous alumina gel, aluminum trihydride, psuedoboehmite alumina, gamma alumina and mixtures thereof.

Typically, the phosphorous containing compound is at least one selected from the group consisting of phosphoric acid, mono ammonium dihydrogen phosphate and diaamonium hydrogen phosphate triammonium phosphate.

Typically, the ratio of the FCC catalyst and the additive component ranges between 1:1 and 10:1

Typically, the amount of zeolite in the FCC catalyst component and/or additive component ranges between 30 and 60 wt %, whereas the amount of clay in FCC catalyst component and/or additive component ranges between 10 and 40 wt %.

In accordance with still another aspect of the present invention there is provided a process for the preparation of a catalyst composition for Fluid Catalytic cracking, comprising:

I. preparing a FCC catalyst component by
  (a) preparing an aqueous homogenous slurry comprising:
    at least one zeolite in an amount ranging between 5 and 60 wt %;
    at least one clay in an amount ranging between 10 and 40 wt %; and
    at least one binder in an amount ranging between 5 and 40 wt %;
  (d) subjecting the homogenous slurry to drying to obtain dried particles;
  (e) dispersing dried particles in 0.01 to 2.0 wt % of at least one rare-earth metal salts to obtain rare-earth metal exchanged particles; and
  (f) subjecting the rare-earth metal exchanged particles to calcination followed by impregnating in 0.01 to 2.0 wt % of at least one alkaline earth metal to obtain a FCC catalyst component;
  all proportions being with respect to the weight of the FCC catalyst component;

II. preparing an additive component by
  (a) preparing an aqueous homogenous slurry comprising:
    at least one zeolite in an amount ranging from 5 to 60 wt %,
    at least one clay in an amount ranging between 10 and 40 wt %;
    at least one binder in an amount ranging from 5 to 40 wt %,
    at least one alkaline earth metal in an amount ranging from 0.01 to 2.0 wt %; and
    at least one phosphorous containing compound in the form of $P_2O_5$ in an amount ranging from 4 to 16 wt %,
    all proportions being with respect to the weight of the additive component;
  (b) subjecting the homogenous slurry to drying to obtain dried particles; and
  (c) subjecting the dried particles to calcination to obtain a dry additive component;
  and III. admixing the FCC catalyst component and the additive component to obtain a catalyst.

Typically, the FCC catalyst component and the additive component are spray dried to obtain said components in the form of microspheres.

Typically, the method step of the preparation of the homogenous slurry comprises the step of preparing the aqueous slurries of each of the ingredients independently and admixing them; wherein the alkaline earth metal is at least one selected from the group consisting of calcium, magnesium and strontium; preferably calcium;

wherein the FCC catalyst component comprises a rare earth metal is selected from the group consisting of lanthanum, cerium, neodymium, samarium, gadolinium, yttrium and combinations thereof;

wherein the zeolite present in the FCC catalyst component is selected from the group consisting of REY, REUSY, USY, beta and combinations thereof;

wherein the zeolite present in the additive component is a medium pore size zeolite selected from the group consisting of ZSM-5, ZSM-11, ZSM-23 zeolite and combinations thereof;

wherein the clay is at least one selected from the group consisting of Kaolin and halloysite;

wherein the binder in the FCC catalyst component comprises an acid treated alumina, colloidal silica and combinations thereof; wherein the alumina is selected from the group consisting of amorphous alumina gel, aluminum trihydride, psuedoboehmite alumina, gamma alumina and mixtures thereof;

wherein the binder in the additive component comprises at least one ingredient selected from the group consisting of clay, phosphorus treated clay, an acid treated alumina, and colloidal silica; wherein the alumina is selected from the group consisting of amorphous alumina gel, aluminum trihydride, psuedoboehmite alumina, gamma alumina and mixtures thereof;

wherein the phosphorous containing compound is at least one selected from the group consisting of phosphoric acid, mono ammonium dihydrogen phosphate and diaamonium hydrogen phosphate triammonium phosphate;

wherein the amount of zeolite in the FCC catalyst component and/or additive component ranges between 30 and 60 wt %;

wherein the amount of clay in FCC catalyst component and/or additive component ranges between 10 and 40 wt %; and wherein the ratio of the FCC catalyst and the additive component ranges between 1: and 10:1.

DETAILED DESCRIPTION OF THE INVENTION

Accordingly, the present invention envisages a FCC catalyst component, an additive component and respective methods of preparation thereof. The present invention also envisages their subsequent application for the cracking of a hydrocarbon feedstock containing hydrocarbons of higher molecular weight and higher boiling point and/or olefinic gasoline naphtha feedstock for producing lower yield of fuel gas without affecting the conversion and yield of general cracking products such as gasoline, propylene and $C_4$ olefins.

The present invention is also directed towards envisaging the effect of an alkaline earth metal on lowering additional production of fuel gas during the catalytic cracking process of the hydrocarbon feedstock without affecting the yield of general cracking products, thereby providing the feasibility of processing inferior quality hydrocarbon feedstock containing hydrocarbons of higher boiling point with reduced production of fuel gas.

Cracking of the hydrocarbonaceous feedstock is carried out in the presence of an admixture comprising the FCC catalyst component and an additive component. The employment of the additive component with the FCC catalyst component boosts the product selectivity of the FCC catalyst composition. Accordingly, the present invention envisages a cracking process of a higher boiling point petroleum feedstock in the presence of a FCC catalyst component admixed with an additive component, prepared in accordance with the present invention. The additive component as used herein is designed and formulated particularly to reduce the additional production of the dry fuel gas during the catalytic cracking process.

The FCC catalyst component and the additive component of the present invention employed in the cracking of higher boiling point petroleum feedstock are present in different catalyst particles in an admixture. FCC catalyst component and the additive components are prepared separately, and admixed together during cracking process.

An integral catalyst composition comprising the FCC catalyst component and the additive component in the same catalyst composition particle are found to suffer from reduced activity compared to the catalyst composition comprising the FCC catalyst component and the additive component in different particles.

In accordance with the present invention, the FCC catalyst component and the additive component are present in separate catalyst composition particles wherein both components are prepared separately and admixed together in a pre-determined ratio during the catalytic cracking process of the higher boiling point petroleum feedstock.

As used herein the terms "A catalyst composition for Fluid Catalytic Cracking (FCC) process" and "a catalyst composition for cracking of higher boiling point petroleum feedstock" are to be used interchangeably to encompass one another and should not be construed in limiting sense and these terms refers to an admixture comprising a FCC catalyst component and an additive component.

As mentioned earlier, the catalyst composition used for cracking of higher boiling point petroleum feedstock of the present invention is typically an admixture of the FCC catalyst component and the additive components, wherein each of said components is prepared separately.

The catalyst composition for Fluid Catalytic Cracking (FCC) in accordance with the present invention comprises:
a FCC catalyst component comprising:
at least one zeolite in an amount ranging between 5 and 60 wt %;
at least one clay in an amount ranging between 10 and 40 wt %;
at least one binder in an amount ranging between 5 and 40 wt %;
at least one alkaline earth metal in an amount ranging between 0.01 and 2.0 wt %; and
at least one rare earth metal precursor in an amount ranging between 0.01 and 2.0 wt %;
and
an additive component comprising:
at least one zeolite in an amount ranging between 5 and 60 wt %;
at least one clay in an amount ranging between 10 and 40 wt %;
at least one binder in an amount ranging between 5 and 40 wt %;
at least one alkaline earth metal in an amount ranging between 0.01 and 2.0 wt %; and
at least one phosphorous containing compound in the form of $P_2O_5$ in an amount ranging between 4 and 16 wt %,
all proportion being with respect to the weight of respective components.

In accordance with the present invention, the ratio of the FCC catalyst component and the additive component ranges between 1:1 and 10:1

In accordance with another aspect of the present invention, there is also provided a process for the preparation of a FCC catalyst composition. The process is described herein below.

In the first step, a FCC catalyst component is prepared which involves the following steps:
(a) preparing an aqueous homogenous slurry comprising:
at least one zeolite in an amount ranging between 5 and 60 wt %;
at least one clay in an amount ranging between 10 and 40 wt %; and
at least one binder in an amount ranging between 5 and 40 wt %;
(b) subjecting the homogenous slurry to drying to obtain dried particles;
(c) dispersing dried particles in 0.01 to 2.0 wt % of at least one rare-earth metal salts to obtain rare-earth metal exchanged particles; and
(d) subjecting the rare-earth metal exchanged particles to calcination followed by impregnating in 0.01 to 2.0 wt % of at least one alkaline earth metal to obtain a FCC catalyst component;
all proportions being with respect to the weight of the FCC catalyst component.

The designing and formulation of the additive component carried out in a very special manner establishes certain physical properties to the additive component; the additive component prepared in a special manner having certain physical properties, when used in combination with the FCC catalyst component, an unexpected shift in product composition is observed as compared to the same process carried out by using the FCC catalyst component alone or with a different catalyst additive.

Therefore, altogether a different approach has been adapted by the inventors of the present invention for the preparation of the additive component so as to provide certain different physical properties to it.

Accordingly, an additive component is prepared which involves the following steps:
(a) preparing an aqueous homogenous slurry comprising:
   at least one zeolite in an amount ranging from 5 to 60 wt %,
   at least one clay in an amount ranging between 10 and 40 wt %;
   at least one binder in an amount ranging from 5 to 40 wt %,
   at least one alkaline earth metal in an amount ranging from 0.01 to 2.0 wt %; and
   at least one phosphorous containing compound in the form of $P_2O_5$ in an amount ranging from 4 to 16 wt %,
   all proportions being with respect to the weight of the additive component;
(b) subjecting the homogenous slurry to drying to obtain dried particles; and
(c) subjecting the dried particles to calcination to obtain a dry additive component.

Finally, the FCC catalyst component and the additive component are admixed to obtain a catalyst composition.

In one embodiment the FCC catalyst component and the additive component are spray dried to obtain the components in the form of microspheres. The obtained microsphere particles of each of said components are further subjected to calcination at a temperature of 500° C. for a period of 1 hour to obtain dry microsphere particles of each of said components independently.

In one embodiment, the method step of the preparation of the homogenous slurry comprises the step of preparing the aqueous slurries of each of the ingredients independently and admixing them. Admixing of the slurries follows no definite order. The ingredient slurries can be mixed in any order.

In accordance with one of the embodiments of the present invention, the aqueous slurries of each independent ingredient are mixed in the order of clay, silica, alumina, and then zeolite.

In accordance with another embodiment of the present invention, the aqueous slurries of each independent ingredient are mixed in the order of clay, silica, zeolite, and then alumina.

In accordance with a still another embodiment of the present invention, the aqueous slurries of each independent ingredient are mixed in the order of clay, alumina, zeolite, and then silica.

In accordance with a yet another embodiment of the present invention, the aqueous slurries of each independent ingredient are mixed in the order of silica, alumina, zeolite, and then clay.

The present invention also provides a process for cracking of higher boiling point petroleum feedstock to obtain lower dry gas without affecting the yield of LPG, light olefins and gasoline products. The process involves contacting the feedstock under reaction conditions suitable for fluid catalytic cracking with a catalyst composition of the present invention.

The zeolite employed in the preparation of the FCC catalyst component of the present invention is a large pore size zeolite (pore size greater than 7 A°) selected from the group consisting of USY, REUSY, REY and combinations thereof.

In accordance with one of the embodiments of the present invention, the zeolite of the FCC catalyst component is a USY zeolite of high hydrothermal stability; silica/alumina ratio of said USY zeolite typically ranges between 5 and 7.2.

In contrast to the large pore size zeolite employed in the preparation of the FCC catalyst, the additive component of the FCC catalyst composition preferably comprises a medium pore size zeolite (pore size in the range of 5 to 6 A°). The smaller size of the zeolite present in the additive component facilitates the selective cracking of linear hydrocarbon to lighter olefins.

In accordance with the present invention, zeolite employed in the preparation of the additive component is a medium pore size zeolite selected from the group consisting of ZSM-5, ZSM-11, ZSM-23 and combinations thereof.

The stabilization of the medium pore size zeolite, particularly ZSM-5 with a phosphorous containing compound is believed to promote the product selectivity and stability of the resultant catalyst composition. Therefore, the medium pore size zeolite present in the additive component of the present invention is stabilized with a phosphorous containing compound prior to its use in the preparation of the additive component.

In accordance with one of the embodiments of the present invention, the medium pore size zeolite is treated with a phosphorous containing compound selected from the group consisting of phosphoric acid, mono ammonium dihydrogen phosphate, diammonium hydrogen phosphate, triammonium phosphate and combinations thereof.

In accordance with the present invention the clay present in both the components is at least one selected from the group consisting of Kaolin and halloysite.

The binder employed in the preparation of the FCC catalyst component comprises an acid treated alumina, colloidal silica and combinations thereof. The alumina includes but is not limited to amorphous alumina gel, aluminum trihydride, psuedoboehmite alumina, gamma alumina and mixtures thereof.

In accordance with the present invention the binder in the additive component comprises at least one ingredient selected from the group consisting of clay, phosphorus treated clay, an acid treated alumina, and colloidal silica; wherein the alumina is selected from the group consisting of amorphous alumina gel, aluminum trihydride, psuedoboehmite alumina, gamma alumina and mixtures thereof.

In accordance with the present invention the phosphorous containing compound is at least one selected from the group consisting of phosphoric acid, mono ammonium dihydrogen phosphate and diaamonium hydrogen phosphate triammonium phosphate.

In accordance with one of the preferred embodiments of the present invention the amount of zeolite in the FCC catalyst component and/or additive component ranges between 30 and 60 wt %, whereas the amount of clay in FCC catalyst component and/or additive component ranges between 10 and 40 wt %.

The silica used in the preparation of the FCC catalyst component as well as additive component is colloidal silica having a mean diameter ranging from 4 nm to about 90 nm, and having the lowest residual soda content, below about 0.3 wt %.

Prior to admixing, the inorganic binder slurry is treated with an acid selected from the group consisting of mineral acid and organic acid that includes but is not limited to a nitric acid, formic acid, acetic acid and combinations thereof.

However, the organic acids are the preferred acids in place of the mineral acids as the residues of the mineral acids such as chloride, sulphate and nitrate radicals present in the zeolite lattice may be hazardous to the hardware as well as to the environment.

The large pore size zeolite present in the FCC catalyst component of the present invention is preferably a rare earth metal exchanged zeolite. The rare earth metal exchange step can be performed either prior the preparation of the FCC catalyst component or can also be performed later onto spray dried microsphere particles of the FCC catalyst component.

In accordance with the present invention, the spray dried microspheres particles of the FCC catalyst component are further subjected to a metal exchange process step wherein the spray dried FCC catalyst component is dispersed in a mixture of rare earth metal salt solution at elevated temperature of 70° C. to 90° C. for a period of 30-60 minutes.

The rare earth metal in the catalyst component includes but is not limited to lanthanum, cerium, neodymium, samarium, gadolinium, yttrium and combinations thereof.

The rare earth metal in the catalyst component includes but is not limited to lanthanum, cerium, neodymium, samarium, gadolinium, yttrium and combinations thereof. In one of the preferred embodiments the rare earth metal salts employed for the metal exchange process and are selected from the group that includes but is not limited to salts of lanthanum, cerium, neodymium, samarium, gadolinium and yttrium or combination thereof. In one embodiment rare earth metal salts are nitrates of rare earth metal.

Upon completion of the exchange process, the rare earth metal exchanged microsphere particles of the FCC catalyst component are washed with water to remove the excess of nitrates present therein. Prior to rare earth exchange, the spray dried microsphere particles of the FCC catalyst component can be exchanged with ammonium ions ($NH_4NO_3$ or $NH_4SO_4$).

The inclusive and through research in to cracking catalyst composition designing, carried out by the inventors of the invention is aiming to develop a FCC catalyst component and an additive that reduces the additional production of dry fuel gas during the catalytic cracking process of the hydrocarbon feedstock. In light of the above specified objects, the inventors of the present invention have designed an alkaline earth metal incorporated FCC catalyst component and additive component, and their subsequent application in the cracking of the hydrocarbon feedstock, more particularly an inferior quality feedstock comprising hydrocarbons of higher boiling point.

The alkaline earth metal can be introduced during the preparation of the FCC catalyst component and the additive component. Alternatively it can be impregnated onto spray dried FCC catalyst component and additive components.

In accordance with one of the embodiments of the present invention, the alkaline earth metal in the FCC catalyst component and additive components is introduced during their method step of preparation.

In accordance with another embodiment of the present invention, the alkaline earth metal is impregnated on to spray dried FCC catalyst component and additive components.

The alkaline earth metal precursor used in the preparation of the FCC catalyst component and additive components is typically a salt of alkaline earth metal that includes but is not limited to nitrates, sulfate, phosphate, carbonate or hydroxides prepared from the salt.

In accordance with the present invention, the salt of the alkaline earth metal is selected from group consisting of salt of calcium, magnesium, strontium and combinations thereof. The alkaline earth metal is present in an amount in the range of 0.01 to 1.0 wt %. Preferably, the alkaline earth metal used is calcium metal.

The FCC catalyst component and the additive components obtained by the process of the present invention are having an average particle size in the range of 70-100 microns with an attrition index in the range of 3-5.

The FCC catalyst component and the additive components, as described herein, has a particular application for the cracking of the hydrocarbon feedstock and/or olefinic gasoline naphtha feed stock for producing lower yield of fuel gas without affecting the general yield pattern of the cracking products such as gasoline propylene, LPG, more particularly LPG.

The FCC catalyst component and the additive components thus obtained independently by the process of the present invention are further hydrothermally deactivated at a temperature of 800° C. to 820° C. using 100% steam at atmospheric pressure.

As mentioned earlier, the catalyst composition employed for the cracking of higher boiling point petroleum feed stock in accordance with the present invention is an admixture of the FCC catalyst component and additive components. The FCC catalyst component and the additive components of the present invention are admixed in a pre-determined weight ratio in a fixed fluid bed microreactor.

The admixture of the hydrothermally deactivated FCC catalyst component and additive components is allowed to contact with higher boiling point petroleum feedstock at reaction conditions suitable for cracking of hydrocarbonaceous feedstock.

The microreactor of the present invention is electrically heated to maintain the cracking catalyst bed temperature typically at 540° C.

To generate cracking data at various catalyst/oil ratio (4:10), the hydrotreated Vacuum Gas Oil (VGO) is injected in the fluidized bed for 30 seconds.

The admixture of the FCC catalyst component and the additive components of the present invention prepared in accordance with the process of the present invention are efficient to decrease the fuel gas production without affecting the yield pattern of general cracking products such as LPG, light olefins and gasoline.

Typically, the catalyst composition for FCC process comprising the admixture of the FCC catalyst component and additive components in pre-determined weight ratio reduces fuel gas production in the range of 20 to 60% during the catalytic cracking process of a hydrocarbon feedstock.

The present invention is further illustrated with reference to the following examples which are to be regarded solely as illustration and not as limiting the scope of the present invention.

Example 1

Example 1 describes the process for the preparation of a FCC catalyst component 333 g of Pural SB grade pseudoboehmite alumina (having loss of ignition of 24 wt %) was mixed with 533 g of demineralized (DM) water. To this 71 g of acetic acid (100% concentration) was added to peptise the alumina. To the peptized alumina slurry, 1667 g of colloidal silica (loss on ignition 70 wt %) was added. In a separate step, 824 g of kaolin clay (having loss on ignition 15 wt %) was mixed with 824 g of DM water under vigorous stirring to obtain clay slurry. To the obtained clay slurry, the silica-alumina slurry was added and stirred vigorously to obtain a homogenous mixture.

In a separate process step, 777.8 g of ammonium USY zeolite (loss on ignition 10 wt %) having silica to alumina molar ratio of 5.2-7.2 was made into a slurry with 777.8 g of DM water and milled to a fine paste to produce a zeolite slurry. The obtained zeolite slurry was then mixed with the clay-silica-alumina slurry for 30 min under vigorous stirring to obtain homogenous slurry. The homogenous slurry was spray dried to get microsphere particle of the FCC catalyst component with Average Particle Size (APS) in the range of 70-100 microns. Spray dried catalyst component was calcined at 500° C. for 1 hr. The measured ABD and attrition index (ASTM D5757) is 0.78 g/cc and 3 respectively.

200 g of calcined FCC catalyst component was exchanged with solution containing Rare earth nitrate salt at temperature of 70-80° C. for 1 hour. The RE exchanged material was washed with hot water to remove excess of nitrate salts and dried overnight at 120° C. followed by calcinations at 500° C. for 1 h. The product contains 0.54 wt % Rare Earth Metal Oxide and 0.28 wt % $Na_2O$. Calcium was impregnated on the FCC catalyst component using Calcium naphthenate salt. The calcium impregnated FCC catalyst component was then hydrothermally deactivated at a temperature of 800° C. for 20 hrs using 100% steam, at atmospheric pressure before performing the cracking reaction. The FCC catalyst component thus prepared was characterized by various physico-chemical techniques.

The physico-chemical properties of the FCC catalyst component of the present invention are tabulated in Table-1. The particle size distribution, attrition index suggest that the said prepared catalyst component is suitable for use in commercial FCC unit.

TABLE 1

Physico-Chemical Properties of the FCC catalyst (without calcium)

| Catalyst component | Catalyst component without calcium |
|---|---|
| Surface area, $m^2/gm$ | |
| Total Surface Area (TSA) | 336 |
| Zeolite Surface Area (ZSA) | 226 |
| Chemical analysis, wt % | |
| $Al_2O_3$ | 29.37 |
| $Na_2O$ | 0.28 |
| $P_2O_5$ | 0.0 |
| Rare Earth Metal Oxide | 0.54 |
| Particle size distribution, % | |
| <20 micron | 0 |
| <40 micron | 4 |
| <80 micron | 67 |
| APS, micron | 71 |
| Attrition Index (ASTM D5757) (wt % loss in 5 hrs) | 3 |

Table-2 of the present invention summarizes the total catalyst component surface area, acidity and pore volume on the effect of calcium in the FCC catalyst component.

TABLE 2

Pore Volume and Acidity of calcium impregnated catalyst

| Parameters | Catalyst (Steamed) | | |
|---|---|---|---|
| Calcium, wt % | 0 | 0.5 | 1.0 |
| Total surface area, $m^2/gm$ | 165 | 149 | 137 |

TABLE 2-continued

Pore Volume and Acidity of calcium impregnated catalyst

| Parameters | Catalyst (Steamed) | | |
|---|---|---|---|
| Zeolite surface area, $m^2/gm$ | 107 | 107 | 92 |
| Zeolite Pore volume, cc/gm | 0.049 | 0.049 | 0.042 |
| Total Pore volume, cc/gm | 0.203 | 0.187 | 0.180 |
| Total pore volume reduction, % | Base | 7.9 | 11.3 |
| Total acidity, mmol/gm | 0.044 | 0.044 | 0.036 |
| Acidity reduction, mmol/gm | Base | Nil | 18 |

From the Table-2, Total Surface Area (TSA) of catalyst component reduces to 137 $m^2/gm$ from 165 $m^2/gm$ with increase in calcium level from 0.0 wt % to 1 wt %. However, there is no drop in total acidity up to 0.5 wt %, but it reduces marginally when calcium level on catalyst component is increased to 1.0 wt %. This is because there is no change in Zeolite Surface Area (ZSA) up to 0.5 wt % calcium. Acidity drops thereafter as ZSA is affected by increasing calcium level at 1.0 wt %. Moreover, it is interesting to note that Total Pore Volume (TPV) drops to 0.187 cc/gm from 0.203 cc/gm by changing calcium from 0.0 wt % to 0.5 wt %. This reduction is mostly due to reduction of matrix pore volume. This means matrix pore is partially filled by calcium at lower level of calcium. However, at higher level of calcium 1 wt %, both matrix and micropore are partially filled with calcium as TPV is dropped to 0.180 cc/gm by increasing calcium level to 1 wt %.

Example 2

Example 2 illustrates the process for the preparation of an additive component of the FCC catalyst composition.

1110 g of ZSM-5 zeolite (loss on ignition 10 wt %) having silica to alumina molar ratio of 30 was made into a slurry with 1200 g of DM water and milled to a fine paste to produce a zeolite slurry. Mono ammonium dihydrogen phosphate (287.2 g) (loss on ignition 23 wt %) was dissolved in 483 g of DM water and mixed with ZSM-5 zeolite slurry under constant stirring to obtain phosphate stabilized zeolite. In a separate step, 131 g of Pural SB grade alumina (having loss of ignition of 24 wt %) was mixed with 431 g of demineralized (DM) water to obtain alumina slurry which was further peptized with 10 g of formic acid. Similarly, 424 g of kaolin clay (having loss on ignition 15 wt %) was made into a slurry with 338 g of DM water and kept under vigorous stirring while 23.5 g of ortho-phosphoric acid (85% concentration) (loss on ignition 15 wt %) was added slowly.

Earlier prepared alumina gel, zeolite-phosphate slurry, clay-phosphate slurry and 1000 g of acidic colloidal silica (loss on ignition 70 wt %) were mixed together under vigorous stirring to obtain homogenous slurry, which was then spray dried. Spray dried product was calcined at 500° C. for 1 hr. The additive product was impregnated with calcium by using calcium naphthenate salt as a precursor and it is characterized for various physico-chemical properties.

Physico-chemical characterization of the additive component is tabulated in Table-3.

TABLE 3

Physico-Chemical Properties of additive component without calcium

| Physico-chemical properties Surface area, $m^2/gm$ | |
|---|---|
| Total Surface Area (TSA) | 140 |
| Zeolite Surface Area (ZSA) | 110 |
| Chemical analysis, wt % | |
| $Al_2O_3$ | 18.70 |
| $Na_2O$ | 0.11 |
| $P_2O_5$ | 11.9 |
| Rare Earth Metal Oxide | 0.0 |
| Particle size distribution, % | |
| <20 micron | 0 |
| <40 micron | 6 |
| <80 micron | 53 |
| APS, micron | 77 |
| Attrition Index (ASTM D5757) (wt % loss in 5 hrs) | 3.5 |

From the data as tabulated in Table-3 of the present invention, it is clearly understood that all the physico-chemical properties like particle size distribution, attrition index etc. of the additive are suitable for their use in FCC unit.

TABLE 4

Effect of calcium impregnation on Pore Volume and acidity of additive

| Parameters | Additive (Steamed) | | |
|---|---|---|---|
| Calcium, wt % | 0 | 0.5 | 1 |
| Total surface area, $m^2/gm$ | 170 | 166 | 148 |
| Zeolite surface area, $m^2/gm$ | 93 | 88 | 77 |
| Zeolite Pore volume, cc/gm | 0.042 | 0.040 | 0.0350 |
| Total Pore volume, cc/gm | 0.153 | 0.151 | 0.1360 |
| Total pore volume reduction, % | Base | 1.3 | 11.10 |
| Total acidity, mmol/gm | 0.100 | 0.090 | 0.062 |
| Acidity reduction, mmol/gm | Base | 10 | 40 |

From the data as provided in Table-4 of the present invention, it is clearly seen that TSA, ZSA, ZPV and TPV of the FCC additive are not changed appreciably by changing the calcium level from 0.0 to 0.5 wt %. Similarly, there is no appreciable change in the total acidity of the catalyst-additive up to 0.5 wt % of calcium. However, at 1.0 wt % of calcium, TSA reduces from 166 to 148 $m^2/gm$, ZSA from 88 to 77 $m^2/gm$, TPV from 0.151 to 0.136 cc/gm, and ZPV from 0.040 cc/gm to 0.035 cc/gm. Similarly, the total acidity is also reduced by 40%.

Example 3

Example 3 illustrates the performance assessment of the FCC catalyst component and additive.

The FCC catalyst component and additive components prepared in accordance with example 1 and 2 of the present invention were hydrothermally deactivated separately at a temperature of 800° C. and at atmospheric pressure for 20 hours using 100% steam. The admixture of the hydrothermally deactivated FCC catalyst component and additive with predetermined ratio of 75:25 was loaded in a fixed fluid bed micro-reactor. The micro-reactor was electrically heated to maintain the catalyst bed temperature at 545° C. The hydrotreated Vacuum Gas Oil (VGO) was injected in the fluidized bed for 30 seconds to generate the cracking data at various catalyst to oil ratio (Cat/Oil) (4-10).

The product selectivity at a fixed conversion of 76 wt % obtained during the cracking process of the hydrocarbon feedstock carried out in the presence of FCC catalyst/additive is tabulated in Table-5 of the present invention.

TABLE 5

Product selectivity at conversion of 76 wt %.

| Parameters | Base Case | Ca doped case | |
|---|---|---|---|
| Calcium, wt % | | 0.5 | 1.0 |
| Yield Pattern (wt %) | | | |
| Conversion (wt %) | 76 | 76 | 76 |
| Fuel gas | 4.8 | 4.6 | 2.9 |
| Total LPG | 39.4 | 40 | 37 |
| LPG (excluding C3) | 22.95 | 23.2 | 21.5 |
| Propylene | 16.45 | 16.8 | 15.5 |
| Gasoline | 28.3 | 27.6 | 31.65 |
| Light Cycle Oil (LCO) | 16.5 | 16.6 | 16.6 |
| Clarified Slurry Oil (CSO) | 7.5 | 7.4 | 7.4 |
| Coke | 3.5 | 3.8 | 4.45 |
| Cat/Oil | 8.2 | 8.6 | 9.2 |
| Conv. at Cat/oil of 8.2 | 76 | 75 | 74 |

Based on the experimental data (Ref Table-5), it is clearly understood that at a concentration of 1.0 wt % Ca present in the catalyst, fuel gas yield reduces from 4.8% to 2.9% at a constant conversion of 76 wt %. On further increasing the calcium level up to 1.0 wt %, the drop in LPG and propylene is predominant and gasoline formation increases to 31.65 wt % from base value of 28.3 wt %. The change in LCO and CSO preparation is not very significant even at a concentration of 1.0 wt % calcium. It is also observed that conversion is dropped from 76 to 74 wt % with the increase in Ca level from 0 to 1.0 wt % at a fixed cat/oil ratio of 8.2.

(d) The present inventors have observed from TPD and surface area/pore volume measurement studies (Refer Table-2 and 4 of the accompanying drawings) that the reduction of fuel gas and LPG including propylene and increase in gasoline make at 1 wt % calcium is due to the significant reduction of acid sites of ZSM-5 additive. The acid sites also decrease due to reduction in both zeolites and matrix pores in 1 wt % Ca loading.

Therefore, depending on the objective, calcium on FCC catalyst component and additive can be varied to get lower fuel gas and higher gasoline without altering undesirable products like LCO and CSO.

Commercial FCC catalyst worked under heat balanced condition. The estimated heat balanced yield is summarized in Table-6 of the present invention.

TABLE 6

Estimated Heat Balance Yield

| Parameters | Base Case | Ca doped case | |
|---|---|---|---|
| Calcium, wt % | | 0.5 | 1.0 |
| Yield Pattern (wt %) | | | |
| Dry gas (wt %) | 4.09 | 3.59 | 2.0 |
| Total LPG | 29.84 | 29.88 | 26.62 |
| LPG (excluding C3) | 20.12 | 20.09 | 18.06 |
| Propylene | 9.72 | 9.79 | 8.54 |
| Gasoline | 39.88 | 39.70 | 43.74 |
| Light Cycle Oil | 13.37 | 13.73 | 14.20 |
| Clarified Slurry Oil | 7.38 | 7.69 | 8.12 |
| Coke | 5.44 | 5.41 | 5.32 |
| Conversion | 79.25 | 78.58 | 77.68 |
| Conv at Cat/oil of 8.2 | 76 | 75 | 74 |

TABLE 6-continued

Estimated Heat Balance Yield

| Parameters | Base Case | | Ca doped case |
|---|---|---|---|
| Process Conditions | | | |
| Riser outlet temp, ° C. | 545 | 545 | 545 |
| Reactor pressure kg/cm²(g) | 2.82 | 2.82 | 2.82 |
| Cat/Oil | 10.28 | 10.25 | 9.96 |

From Table-6 of the present invention, it is observed that the conversion decreases marginally with the increase in calcium level from 0.5 and 1.0 wt %, Dry gas production reduces significantly by 2.09 wt % as the calcium level on the catalyst increases to 1.0 wt %. As the calcium level increased to 1.0 wt %, the drop in LPG and propylene is predominant. However, gasoline formation increases to 43.7% from base value of 39.9 wt %. The increment in LCO and CSO formation is not very significant at 0.5 wt % calcium, however, with 1.0 wt % calcium, LCO increases to 14.2% from base value of 13.4%. From the Table-6, it may be noted that the valuable product (i.e. LPG+ gasoline) for base is 69.7 wt % against 70.3 wt % with catalyst component and additive containing 1 wt % calcium. In other words, the use of calcium containing catalyst component and additive generate cushion in reactor cyclone velocity by reducing dry gas make. Hence, the FCC units having reactor cyclone velocity limitation can use admixture of the FCC catalyst component and the additive components of the present invention for making higher valuable products.

Technical Advantages

Technical advantages of the present invention lie in providing a process for the preparation of a FCC catalyst and an additive component, and compositions thereof for cracking of a hydrocarbon feedstock containing hydrocarbons of higher boiling point and higher molecular weight comprising:

reduced production of fuel gas without altering the yield of the valuable cracking products such as gasoline, LPG and diesel. The use of calcium containing FCC catalyst component and additive generate cushion in reactor cyclone and allow to operate with higher reactor severity within the limit of reactor cyclone velocity.

cracking of the hydrocarbon feedstock containing hydrocarbons of higher boiling point and higher molecular weight (inferior quality) with reduced production of fuel gas.

"Whenever a range of values is specified, a value up to 10% below and above the lowest and highest numerical value respectively, of the specified range, is included in the scope of the invention".

While considerable emphasis has been placed herein on the preferred embodiments, it will be appreciated that many embodiments can be made and that many changes can be made in the preferred embodiments without departing from the principles of the invention. These and other changes in the preferred embodiments as well as other embodiments of the invention will be apparent to those skilled in the art from the disclosure herein, whereby it is to be distinctly understood that the forgoing descriptive matter to be implemented merely as illustrative of the invention and not as limitation.

The invention claimed is:

1. A process for cracking of higher boiling point petroleum feedstock in the presence of a catalyst composition to reduce dry gas production without affecting the yield of LPG, light olefins and gasoline products; said process comprising contacting said feedstock under reaction conditions suitable for fluid catalytic cracking with the catalyst composition in a fluidized bed; wherein the catalyst composition comprises:
  (a) an FCC catalyst component comprising:
    at least one zeolite in an amount ranging between 5 and 60 wt %;
    at least one clay in an amount ranging between 10 and 40 wt %;
    at least one binder in an amount ranging between 5 and 40 wt %;
    at least one alkaline earth metal in an amount ranging between 0.01 and 2.0 wt %; and
    at least one rare earth metal selected from the group consisting of lanthanum, cerium, neodymium, samarium, gadolinium and yttrium in an amount ranging between 0.01 and 2.0 wt %;
  wherein, the zeolite present in the FCC catalyst component is selected from the group consisting of REY, REUSY, USY, beta and combinations thereof;
  all proportion being with respect to the weight of the FCC catalyst components;
  (b) an additive component comprising:
    at least one zeolite in an amount ranging between 5 and 60 wt %;
    at least one clay in an amount ranging between 10 and 40 wt %;
    at least one binder in an amount ranging between 5 and 40 wt %;
    at least one alkaline earth metal in an amount ranging between 0.01 and 2.0 wt %; and
    at least one phosphorous containing compound in the form of $P_2O_5$ in an amount ranging between 4 and 16 wt %, and
  wherein the zeolite present in the additive component is a medium pore size zeolite selected from the group consisting of ZSM-5, ZSM-11, ZSM-23 zeolite and combinations thereof;
  wherein the weight ratio of the amount of the FCC catalyst component and the amount of the additive component ranges between 1:1 and 10:1;
  all proportion being with respect to the weight of the respective FCC catalyst and additive components.

2. The process as claimed in claim 1, wherein the catalyst reduces dry gas production in the range of 20 to 60% during the catalytic cracking process of said feedstock.

3. The process as claimed in claim 1, wherein the alkaline earth metal is present in an amount in the range of 0.01 to 1.0 wt %; wherein the alkaline earth metal is at least one selected from the group consisting of calcium, magnesium and strontium.

4. The process as claimed in claim 1, wherein the clay is at least one selected from the group consisting of Kaolin and halloysite.

5. The process as claimed in claim 1, wherein the binder in the FCC catalyst component comprises an acid treated alumina, colloidal silica and combinations thereof; wherein the alumina is selected from the group consisting of amorphous alumina gel, aluminum trihydride, psuedoboehmite alumina, gamma alumina and mixtures thereof.

6. The process as claimed in claim 1, wherein the binder in the additive component comprises at least one ingredient selected from the group consisting of, an acid treated alumina, and colloidal silica; wherein the alumina is selected from the group consisting of amorphous alumina gel, aluminum trihydride, psuedoboehmite alumina, gamma alumina and mixtures thereof.

7. The process as claimed in claim 1, wherein the phosphorous containing compound is at least one selected from the group consisting of phosphoric acid, mono ammonium dihydrogen phosphate, diammonium hydrogen phosphate, and triammonium phosphate.

8. The process as claimed in claim 1, wherein the amount of the zeolite in the FCC catalyst component ranges between 30 and 60 wt %, whereas the amount of the clay in FCC catalyst component and the additive component ranges between 10 and 40 wt %.

\* \* \* \* \*